US010001356B2

(12) United States Patent
Tanaka (10) Patent No.: US 10,001,356 B2
(45) Date of Patent: Jun. 19, 2018

(54) COLLISION PREVENTION DEVICE OF MEASURER (71) Applicant: MITUTOYO CORPORATION, Kanagawa (JP)

(72) Inventor: Shoichi Tanaka, Ebina (JP)

(73) Assignee: MITUTOYO CORPORATION, Kanagawa (JP)

( * ) Notice: Subject to any disclaimer, the term of this patent is extended or adjusted under 35 U.S.C. 154(b) by 120 days.

(21) Appl. No.: 15/171,114

(22) Filed: Jun. 2, 2016

(65) Prior Publication Data

US 2016/0363431 A1  Dec. 15, 2016

(30) Foreign Application Priority Data

Jun. 10, 2015 (JP) ................. 2015-117543

(51) Int. Cl.
*G01B 5/008* (2006.01)
*G01B 21/04* (2006.01)

(52) U.S. Cl.
CPC ........... *G01B 5/008* (2013.01); *G01B 21/047* (2013.01)

(58) Field of Classification Search
CPC ............................ G01B 5/008; G01B 21/047
USPC ................... 33/502–503, 550–551, 553–554
See application file for complete search history.

(56) References Cited

U.S. PATENT DOCUMENTS

| 4,574,199 | A | * | 3/1986 | Pryor | G01B 11/007 250/559.33 |
| 4,578,873 | A | * | 4/1986 | Klingler | G01B 5/012 33/556 |
| 4,583,000 | A | * | 4/1986 | Pryor | G01B 11/007 250/559.31 |
| 4,637,119 | A | * | 1/1987 | Schneider | G01B 7/008 279/128 |
| 4,713,892 | A | * | 12/1987 | Strauss | B23Q 5/58 33/556 |
| 4,916,825 | A | * | 4/1990 | Breyer | G01B 7/002 33/556 |
| 4,953,306 | A | * | 9/1990 | Weckenmann | G01B 5/008 33/1 M |
| 5,615,489 | A | * | 4/1997 | Breyer | G01B 5/012 33/503 |
| 5,822,877 | A | * | 10/1998 | Dai | G01B 7/012 33/560 |
| 5,825,666 | A | * | 10/1998 | Freifeld | G01B 11/005 279/128 |
| 6,108,924 | A | * | 8/2000 | Jang | G01B 5/207 33/552 |

(Continued)

FOREIGN PATENT DOCUMENTS

JP 3831561 B2 10/2006

*Primary Examiner* — R. A. Smith
*Assistant Examiner* — Tania Courson
(74) *Attorney, Agent, or Firm* — Greenblum & Bernstein, P.L.C.

(57) ABSTRACT

A collision prevention device of a measurer measuring dimensions or the like of a measured object while relatively displacing the measured object and a non-contact probe. The collision prevention device includes a pole-shaped spindle extending alongside the non-contact probe; a support mechanism supporting the spindle such that a forefront end of the spindle projects farther than the non-contact probe; and a switch detecting a collision between the spindle and the measured object.

8 Claims, 5 Drawing Sheets

(56) References Cited

U.S. PATENT DOCUMENTS

| | | | | |
|---|---|---|---|---|
| 6,163,973 | A * | 12/2000 | Matsumiya | G01B 11/303 33/503 |
| 6,333,696 | B1 | 12/2001 | Matsumiya et al. | |
| 6,360,176 | B1 * | 3/2002 | Nishioki | G01B 7/002 702/113 |
| 6,477,784 | B2 * | 11/2002 | Schroeder | G01B 5/012 33/503 |
| 6,812,850 | B2 | 11/2004 | Matsumiya et al. | |
| 7,194,818 | B2 * | 3/2007 | Otsubo | G01B 21/047 33/502 |
| 7,227,647 | B2 * | 6/2007 | Ferger | G01B 5/285 250/433 |
| 7,364,393 | B2 * | 4/2008 | Collingwood | B23B 31/006 408/8 |
| 8,336,223 | B2 * | 12/2012 | Nakayama | G01B 21/047 33/503 |
| 9,341,460 | B2 * | 5/2016 | Kurihara | G01B 5/016 |
| 9,429,416 | B2 * | 8/2016 | Kocic | G01B 11/005 |
| 9,581,424 | B2 * | 2/2017 | Takanashi | G01B 5/201 |
| 9,810,516 | B2 * | 11/2017 | Anzai | G01B 5/008 |
| 2002/0148275 | A1 * | 10/2002 | Abbe | B25J 9/1692 73/1.01 |
| 2005/0166413 | A1 * | 8/2005 | Crampton | B25J 13/088 33/503 |
| 2009/0303068 | A1 * | 12/2009 | Arai | G01B 9/04 340/686.1 |
| 2014/0109420 | A1 * | 4/2014 | Kurihara | G01B 5/016 33/502 |
| 2015/0285616 | A1 * | 10/2015 | Jordil | G01B 21/047 348/135 |

\* cited by examiner

COLLISION PREVENTION DEVICE OF MEASURER

CROSS-REFERENCE TO RELATED APPLICATIONS

The present application claims priority under 35 U.S.C. § 119 of Japanese Application No. 2015-117543, filed on Jun. 10, 2015, the disclosure of which is expressly incorporated by reference herein in its entirety.

BACKGROUND OF THE INVENTION

1. Field of the Invention

The present invention relates to a collision prevention device of a measurer. More specifically, the present invention relates to a collision prevention device of a measurer measuring dimensions or the like of a measured object while relatively displacing the measured object and a non-contact probe.

2. Description of Related Art

A known example of a measurer using a non-contact probe is a coordinate image measurement device capable of displacing a measured object or a non-contact probe in mutually orthogonal X, Y, and Z axis directions and of measuring dimensions or the like of the measured object based on an image acquired by the non-contact probe.

In the coordinate image measurement device of this kind, the non-contact probe is used at a position adjacent to the measured object. In particular, during measurement, the non-contact probe is displaced in three-dimensional directions relative to the measured object. At this point, the non-contact probe may collide with the measured object due to operator inattention, a mistaken setting for coordinates input to a computer, or the like.

In order to prevent damage to the non-contact probe, measurement device main body, measured object, and the like due to such a collision, a collision prevention device for a measurer has been proposed (Japanese Patent Publication No. 3831561). In the collision prevention device described by Japanese Patent Publication No. 3831561, a ring-shaped collision detector is provided covering a non-contact probe, and when the collision detector is displaced relative to the non-contact probe, the relative displacement is detected and a command is given to stop displacement or to retreat.

In order to make the collision prevention device described in Japanese Patent Publication No. 3831561 effective at preventing collisions in any direction of three-dimensional displacement, the ring-shaped collision detector covering an outer circumference of the non-contact probe is used. However, under the following conditions, the collision prevention device according to Japanese Patent Publication No. 3831561 may not be fully effective.

First, in a case where an operation portion is provided to a surface of the probe and an operator operates the operation portion. With the above-described collision prevention device, the ring-shaped collision detector may obscure the operation portion and prevent the operator from operating the operation portion on such a probe.

Second, in a case where a measured surface of the measured object is flat and includes no height-direction unevenness. With such a measured object, there is no risk of collision when displacing in the X axis direction and Y axis direction (both directions lying along the measured surface). Preventing collisions in the Z axis direction only is sufficient. However, the above-described collision prevention device uses the ring-shaped collision detector which encompasses a Z axis area. This configuration is excessive.

Third, in a case where a Z axis direction working distance of the probe is extremely small. With the above-described collision prevention device, a certain displacement distance is required in order to respond to contact. In addition, even when a portion of the ring-shaped collision detector makes contact with the flat surface of the measured object while displacing in the Z axis direction, in some cases the contact cannot be detected until there is further displacement in the Z axis direction and a majority of the ring-shaped collision detector makes contact, and the displacement cannot be safely stopped.

SUMMARY OF THE INVENTION

A non-limiting feature of the present invention provides a collision prevention device of a measurer having a simple structure that does not cover a non-contact probe and which is capable of detecting contact even when a Z axis direction displacement distance is small.

The present invention relates to a collision prevention device of a measurer measuring dimensions or the like of a measured object while relatively displacing the measured object and a non-contact probe. The collision prevention device includes a pole-shaped impact member extending alongside the non-contact probe; a support mechanism supporting the impact member such that a forefront end of the impact member projects farther than the non-contact probe; and a switch detecting a collision between the impact member and the measured object.

With the present invention, the pole-shaped impact member is provided alongside the non-contact probe using the support mechanism. In this situation, the forefront end of the impact member projects farther than the non-contact probe. Therefore, when the non-contact probe approaches the measured object, the forefront end of the impact member collides with the measured object before there is a collision between the non-contact probe and the measured object. The collision is detected by the switch and displacement can be stopped.

In the present invention, the impact member has a pole shape, and therefore the impact member does not cover the non-contact probe. Even when the non-contact probe includes an operation portion, the impact member does not interfere with operation by an operator. In addition, because the impact member has a pole shape, the structure can be made simpler than that of a conventional ring-shaped collision detector. Moreover, a collision can be detected the moment the forefront end of the pole-shaped impact member contacts the measured object, and collision detection as well as halting displacement can be performed more reliably than with a conventional ring-shaped collision detector.

In the collision prevention device of the measurer according to the present invention, the impact member preferably includes an expansion/contraction mechanism expanding and contracting in a length direction of the impact member.

In the present invention, the expansion/contraction mechanism expands and contracts, thereby enabling the forefront end of the impact member to displace in the length direction of the impact member, alleviating an impact when there is a collision with the measured object, and enabling prevention of damage or the like to the measured object. Likewise, in order to prevent damage or the like to the measured object, the forefront end of the impact member may be configured by a synthetic resin molded article.

In the collision prevention device of the measurer according to the present invention, the support mechanism preferably includes an adjustment mechanism capable of adjusting a support position in the length direction of the impact member.

In the present invention, the position of the forefront end of the impact member can be adjusted by the adjustment mechanism. Through such adjustment, the amount by which the forefront end of the impact member projects past the non-contact probe can be adjusted and characteristics of the collision detection can be adjusted. In addition, even in a case where the dimensions of the non-contact probe have changed, the support position of the impact member can be adjusted to accommodate such changes.

In the collision prevention device of the measurer according to the present invention, the support mechanism preferably includes a retreat mechanism causing the impact member to retreat.

In the present invention, using the retreat mechanism, the impact member can be made to retreat from a position where collision detection is performed (i.e., a position where contact with the measured object is possible), to a position not in contact with the measured object. The position not in contact with the measured object may include, at least, a state where the forefront end of the impact member does not project past the forefront end of the non-contact probe. Therefore, in a case where collision detection is unnecessary (for example, in a case where the non-contact probe is displaced along the surface of the measured object), by retreating the impact member ahead of time, unnecessary contact between the impact member and the measured object can be prevented before such contact occurs.

In the collision prevention device of the measurer according to the present invention, the support mechanism preferably includes a probe switching mechanism capable of switching the support position in the length direction of the impact member in accordance with a type of the non-contact probe.

In the present invention, using the probe switching mechanism, the support position of the impact member can be switched in accordance with the type of non-contact probe. Therefore, even in a case where the type of non-contact probe has changed, the position of the forefront end of the impact member can be maintained in a predetermined relationship with respect to the non-contact probe.

According to the present invention, a collision prevention device of a measurer can be provided that has a simple structure that does not cover a non-contact probe and that is capable of detecting contact even when a Z axis direction displacement distance is small.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

Coordinate Measuring Device

Figure 1:
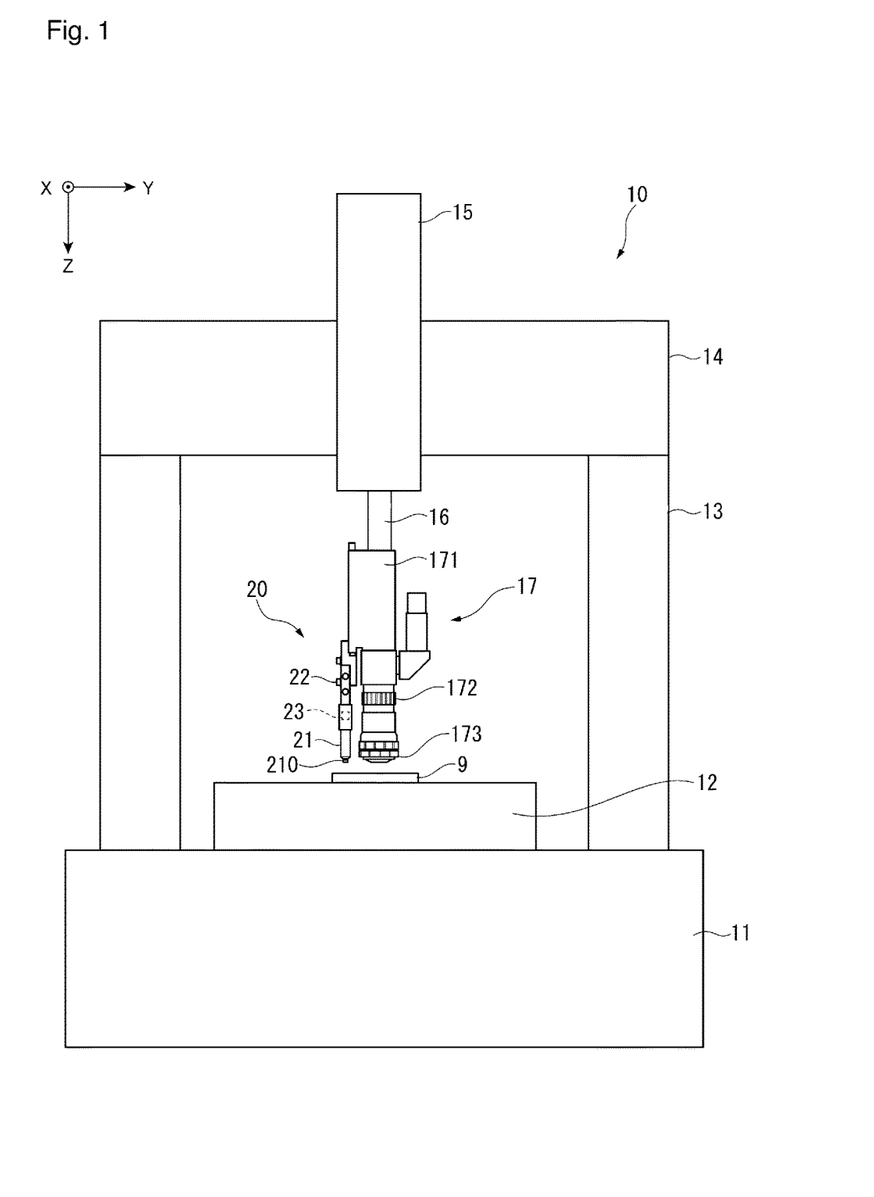
FIG. 1 is a front view of a coordinate measuring device according to a first embodiment of the present invention.

In FIG. 1, a coordinate measuring device 10 includes a stage 12 and gate-shaped columns 13 on a top surface of a stand 11. A slider 15 is supported on a crossbeam 14 on the columns 13. The slider 15 has a ram 16 provided so as to be oriented downward, and a non-contact probe 17 is mounted to a forefront end of the ram 16.

In the coordinate measuring device 10, the stage 12 is capable of displacement in an X axis direction relative to the stand 11; the slider 15 is capable of Y axis displacement along the crossbeam 14; and the ram 16 is capable of Z axis displacement relative to the slider 15. Such displacement along the various axes enables the non-contact probe 17 to displace to a desired three-dimensional position relative to the stage 12.

A work piece 9 (measured object) is placed on the stage 12. A surface of the work piece 9 is flat, and a fine shape of the surface is measured by the non-contact probe 17. The non-contact probe 17 captures an image of the surface of the work piece 9 and measures the fine shape of the surface through image processing.

Figure 2:
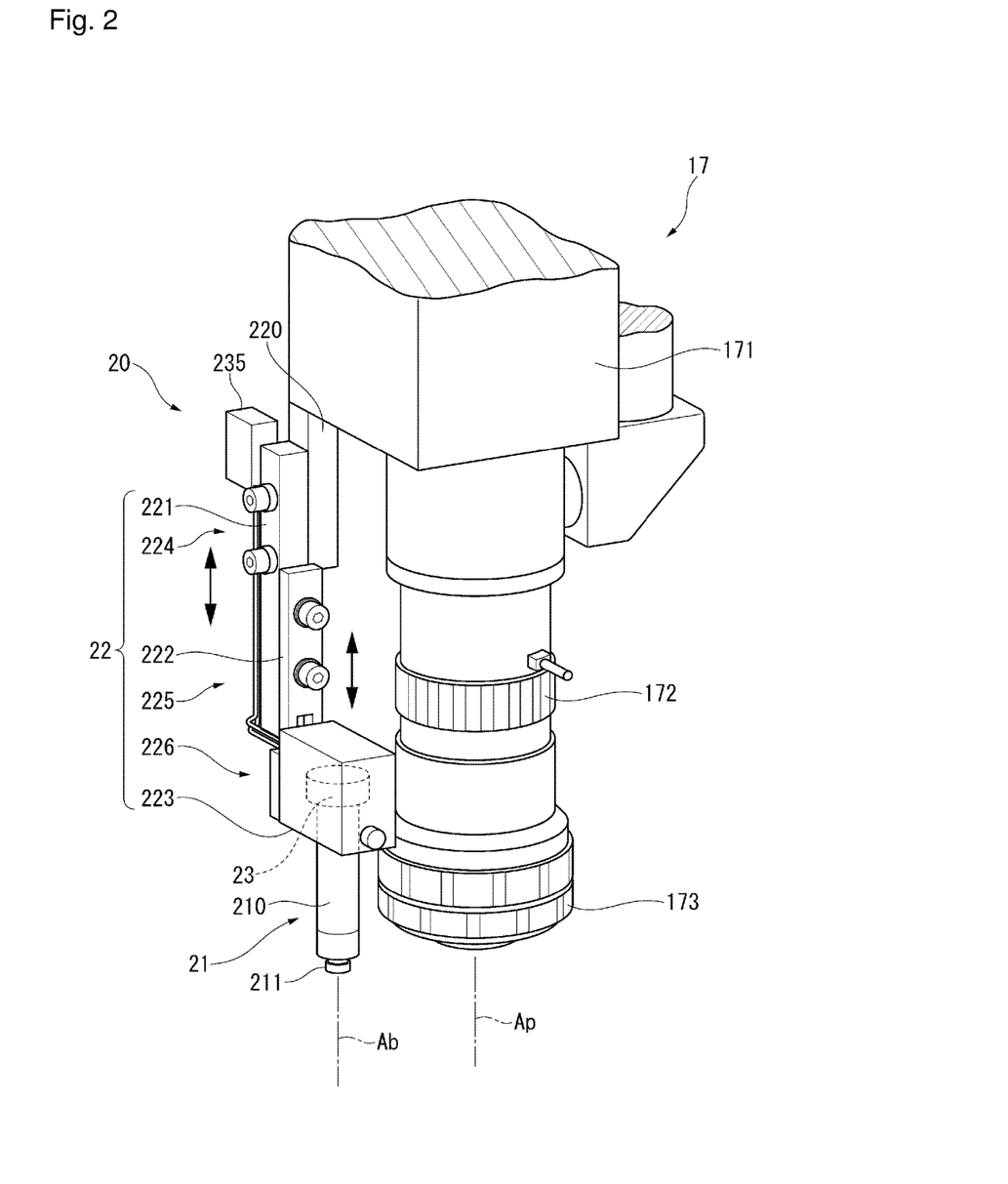
FIG. 2 is an enlarged perspective view of a non-contact probe and a collision prevention device according to the embodiment.

As shown in FIG. 2, the non-contact probe 17 includes a rectangular columnar probe main body 171. A lens barrel 172 which extends downward is provided to the probe main body 171. An image capture optical system is housed in the lens barrel 172, and a field lens 173 (discussed above) is provided to a bottom end of the lens barrel 172.

When measuring the surface of the work piece 9 with the non-contact probe 17, the field lens 173 approaches the surface of the work piece 9. During this approach, in order to prevent a collision between the non-contact probe 17 and the surface of the work piece 9, a collision prevention device 20 is provided to the non-contact probe 17.

Collision Prevention Device 20

Figure 3:
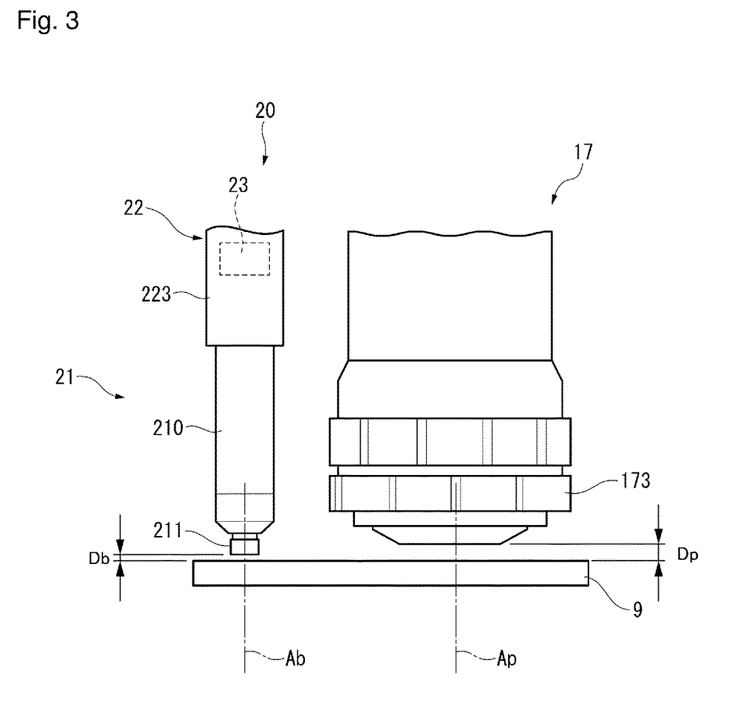
FIG. 3 is an enlarged side view of relevant portions of the collision prevention device according to the embodiment.

The collision prevention device 20 includes a spindle 21 as an impact member (also referred to as a "rod") and a support mechanism 22 member (also referred to as a "support") supporting the spindle 21 alongside the non-contact probe 17. As shown in FIG. 3, an axis line Ab of the spindle 21 is provided parallel to an axis line Ap of an optical path of the non-contact probe 17.

In addition, the forefront end of the spindle 21 is supported so as to project further than the forefront end of the field lens 173 of the non-contact probe 17. In other words, when the non-contact probe 17 approaches the surface of the work piece 9, a distance Db between the forefront end of the spindle 21 and the surface of the work piece 9 is defined so as to be smaller (i.e., closer) than a distance Dp between the forefront end of the field lens 173 and the surface of the work piece 9.

Support Mechanism 22

The support mechanism 22 includes a support arm 220, an upper arm 221, a middle arm 222, and a lower block 223. The support arm 220 has a rectangular pole shape and is fixated, oriented downward, to one corner on a bottom surface of the probe main body 171. The upper arm 221 is formed in a rectangular pole shape. A predetermined length of the upper arm 221 lies along a surface (side surface) of the support arm 220, and the two members are fixated to each other by tightening a plurality of bolts.

The middle arm 222 is formed in a rectangular pole shape. A predetermined length of the middle arm 222 lies along a surface (side surface orthogonal to the side surface attached to the support arm 220) of the upper arm 221, and the two members are fixated to each other by tightening a plurality of bolts. The lower block 223 is formed in a box shape and is fixated to a bottom end portion of the middle arm 222. In addition, the spindle 21 is supported on a bottom surface side of the lower block 223.

An adjustment mechanism 224, a retreat mechanism 225, and a probe switching mechanism 226 are provided to the support arm 220, the upper arm 221, the middle arm 222, and the lower block 223.

Adjustment Mechanism 224

By loosening the plurality of bolts fixating the upper arm 221 and the support arm 220, the fixated position of the upper arm 221 with respect to the support arm 220 can be adjusted by minute distances in the length direction of each of the two members. This configures the adjustment mechanism 224, which adjusts the support position in the length direction of the spindle 21.

Using the adjustment mechanism 224 of this kind, an amount by which the forefront end of the spindle 21 projects past the forefront end of the non-contact probe 17 (a difference between the distance Db and the distance Dp, noted above) can be adjusted and sensitivity of the collision prevention can be adjusted.

Retreat Mechanism 225

By loosening the plurality of bolts fixating the middle arm 222 and the upper arm 221, the fixated position of the middle arm 222 with respect to the upper arm 221 can be modified over much larger distances in the length direction of each of the two members, as compared to an adjustment range of the adjustment mechanism 224. This configures the retreat mechanism member (also referred to as a "retractor") 225, which causes the spindle 21 to retreat, or retract, from the normal support position.

Using the retreat mechanism 225 of this kind, the spindle 21 can be retreated until the forefront end of the spindle 21 does not project past the forefront end of the non-contact probe 17, and interference between the spindle 21 and the work piece 9 or the like can be avoided when the spindle 21 is not needed for collision prevention. Using the retreat mechanism 225, a displacement amount of the spindle 21 is 10 mm, for example.

Probe Switching Mechanism 226

A portion where the lower block 223 and the middle arm 222 are fixated to each other is treated as a slide mechanism capable of engagement at a plurality of positions (for example, a guide rail mechanism with a latch), and the lower block 223 can be fixated at a plurality of positions in the length direction of the middle arm 222.

In this example, the plurality of positions at which the lower block 223 can be fixated are defined in accordance with the types of non-contact probe 17. In other words, by designating a first position when the non-contact probe 17 is a first probe and a second position when the non-contact probe 17 is a second probe, the forefront end of the spindle 21 can be positioned with an appropriate amount of projection relative to the forefront end of the probe.

This configures the probe switching mechanism (also referred to as a "probe switch") 226, which is capable of switching the length-direction support position of the spindle 21 in accordance with the types of non-contact probe 17. Using the probe switching mechanism 226, the displacement amount of the spindle 21 is 2.2 mm both upward and downward, for example.

Spindle 21

Figure 4:
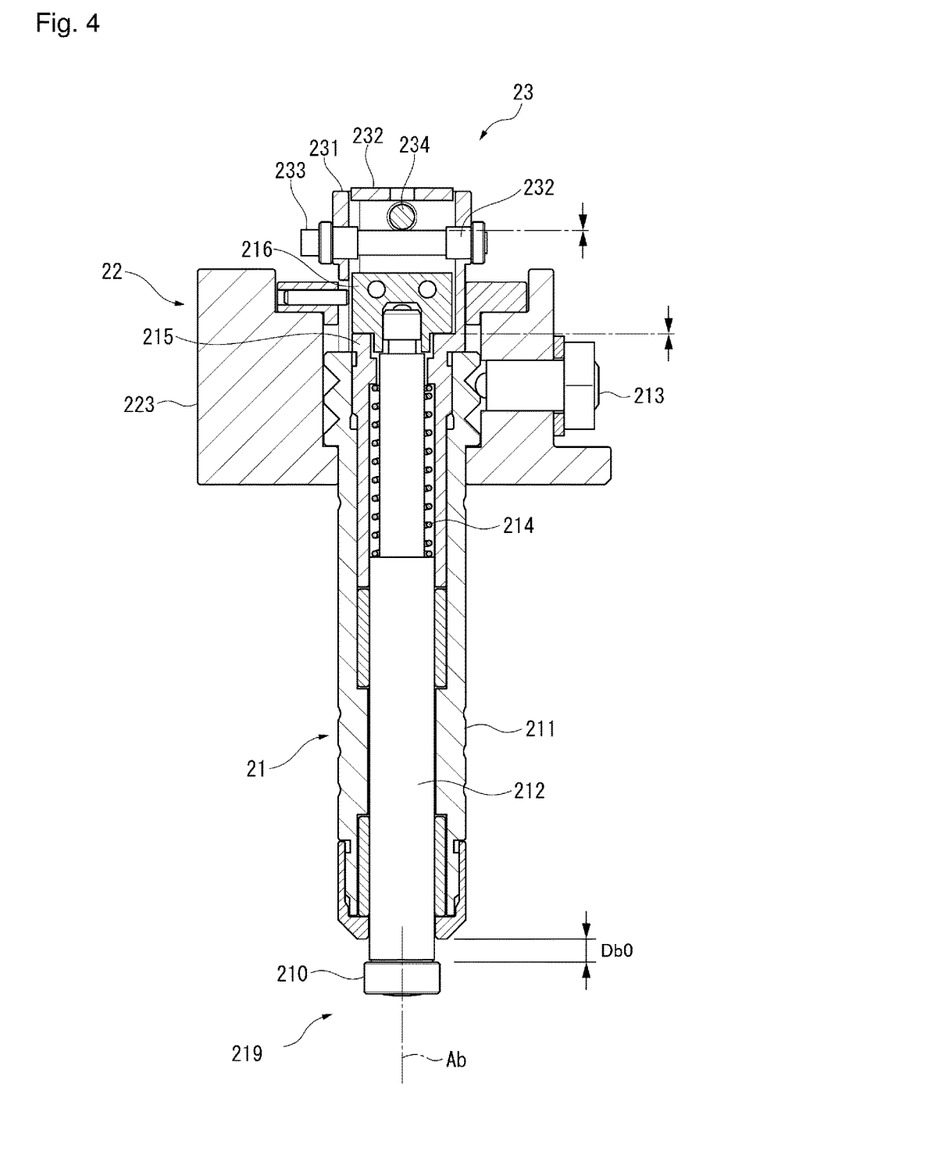
FIG. 4 is a cross-sectional view of a non-impact state of the collision prevention device according to the embodiment.
Figure 5:
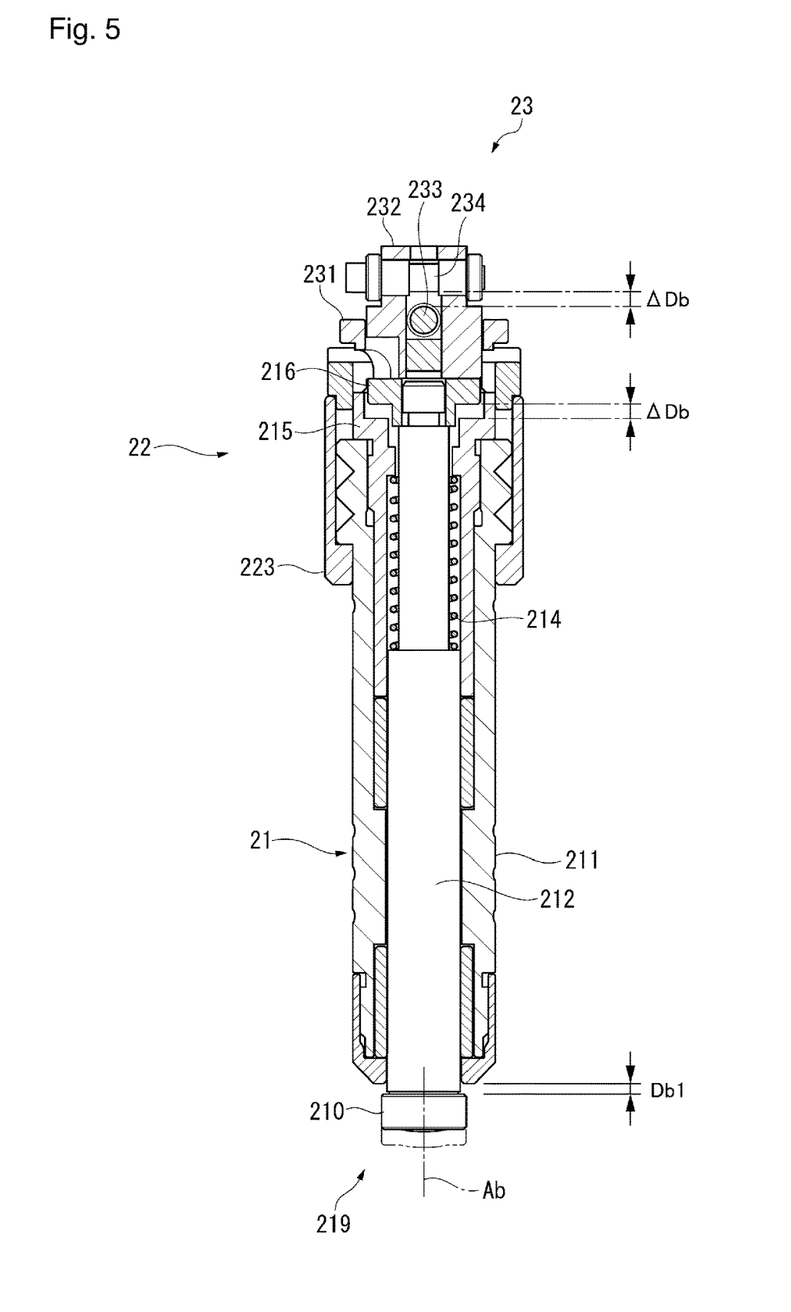
FIG. 5 is a cross-sectional view of an impact state of the collision prevention device according to the embodiment.

The spindle 21 is a pole-shaped member which is supported alongside the non-contact probe 17 by the support mechanism 22, described above, such that the forefront end of the spindle 21 projects farther than the non-contact probe 17. FIGS. 4 and 5 show an internal structure of the spindle 21. Moreover, although FIGS. 4 and 5 are each cross-sectional views along the axis line Ab of the spindle 21, each shows a cross-section at an orientation differing from the other by 90°.

In FIGS. 4 and 5, the spindle 21 includes a hollow, tubular spindle main body 211 and a displacement member 212 capable of displacement through an interior of the spindle main body 211. An upper end side of the spindle main body 211 is inserted into the lower block 223 of the support mechanism 22 from the bottom surface side and is fixated in place by a set screw 213.

An end member 216 is mounted to a top end of the displacement member 212. The end member 216 abuts a top end of a sleeve 215 of the spindle main body 211, restricting downward displacement. A step is formed at a middle section of the displacement member 212. Due to this step, an upper side of the displacement member 212 has a smaller diameter across a predetermined length than the diameter of a portion lower than the step. A coil spring 214 is mounted on an outer circumference of this small diameter portion.

A bottom end of the coil spring 214 is engaged with the step in the middle portion of the displacement member 212. The sleeve 215 is provided between the spindle main body 211 and the spindle main body 211, and an upper end side of the coil spring 214 is engaged on a projection provided on the top end of the sleeve 215.

The displacement member 212 is biased downward with respect to the spindle main body 211 by the coil spring 214. Accordingly, the displacement member 212 is biased downward by the coil spring 214 and a lower limit of the displacement of the displacement member 212 (i.e., a state where the end member 216 abuts the sleeve 215) is ordinarily maintained.

A synthetic resin chip 210 is mounted to the bottom end of the displacement member 212. In a normal state where the displacement member 212 is at the displacement lower limit, there is an interval Db0 between the chip 210 and the forefront end of the spindle main body 211 (see FIG. 4). In this state, as noted above, the end member 216 and the sleeve 215 are in a state of contact with each other.

In this example, in a case where the chip 210 strikes the work piece 9, or the like, when an outside force oriented upward is applied to the displacement member 212, the displacement member 212 resists the biasing force of the coil spring 214 and displaces upward, and an interval Db1 to the forefront end of the spindle main body 211 decreases (see FIG. 5). In this state, the end member 216 grows distant from the sleeve 215, creating an interval ΔDb between the two.

In this way, in the spindle 21, the displacement member 212 advances and retreats relative to the spindle main body 211, and thus a length of the spindle 21 to the chip 210 changes. This configures an expansion/contraction mechanism member (also referred to as a "displacer") 219 in the spindle 21. In this case, the amount of displacement of the chip 210 (i.e., an amount of expansion/contraction of the spindle 21) is the interval ΔDb=Db0−Db1. The interval ΔDb (amount of expansion/contraction) is, for example, 1.2 mm.

Switch 23

The collision prevention device 20 includes a switch 23 detecting a collision between the spindle 21 and the work piece 9. The switch 23 is provided with an external cylinder 231 connected to the top end of the spindle main body 211; an internal cylinder 232 connected to the end member 216; a fixated contact point 233 through which an upper portion of the external cylinder 231 passes; and a displacement contact point 234 through which a vicinity of the top end of the internal cylinder 232 passes.

The fixated contact point 233 and the displacement contact point 234 are provided in mutually intersecting directions and are capable of abutting each other at a middle location on each. In a state where the displacement member 212 is at the displacement lower limit (see FIG. 4), in the spindle 21, the end member 216 and the sleeve 215 make contact with each other, and the fixated contact point 233 and the displacement contact point 234 also make contact with each other. The fixated contact point 233 and the displacement contact point 234 thereby enter an electrically conductive state.

Meanwhile, in a case where the chip 210 collides with the work piece 9, for example, in a case where the displacement member 212 displaces upward (see FIG. 5), the interval ΔDb is created between the end member 216 and the sleeve 215, and the interval ΔDb is also created between the fixated contact point 233 and the displacement contact point 234. The fixated contact point 233 and the displacement contact point 234 thereby enter an electrically insulated state. Accordingly, an impact between the spindle 21 and the work piece 9 can be detected by monitoring whether there is conduction between the fixated contact point 233 and the displacement contact point 234 in an external circuit.

As shown in FIG. 2, the switch 23 is arranged on a top end portion of the spindle 21 and is accommodated, together with the top end portion, in the interior of the lower block 223. In addition, wiring from the fixated contact point 233 and the displacement contact point 234 of the switch 23 is routed upward along the support mechanism 22 and can be connected to wiring of the probe main body 171 via a wiring box 235 provided near the probe main body 171.

Effect of the Embodiment

The following advantages can be achieved according to the above-described embodiment. In the present embodiment, the pole-shaped spindle 21 (impact member) is provided alongside the non-contact probe 17 using the support mechanism 22. In this case, the forefront end of the spindle 21 is arranged so as to project farther than the non-contact probe 17. Therefore, when the non-contact probe 17 approaches the work piece 9 (measured object), the forefront end of the spindle 21 collides with the work piece 9 before there is an impact between the non-contact probe 17 and the work piece 9. The collision is detected by the switch 23 and displacement can be stopped.

In the present embodiment, the spindle 21 has a pole shape, and therefore the spindle 21 does not cover the non-contact probe 17. Even when the non-contact probe 17 includes an operation portion, the spindle 21 does not interfere with operation by an operator. In addition, because the spindle 21 has a pole shape, the structure can be made simpler than that of a conventional ring-shaped collision detector. Moreover, a collision can be detected the moment the forefront end of the pole-shaped spindle 21 contacts the work piece 9, and collision detection as well as halting displacement can be performed more reliably than with a conventional ring-shaped collision detector.

In the present embodiment, the spindle 21 includes the expansion/contraction mechanism 219. Therefore, the spindle 21 can expand or contract when the forefront end of the spindle 21 contacts the work piece 9, and the forefront end of the spindle 21 (the chip 210) is capable of displacement in the length direction of the spindle 21, enabling the impact to be alleviated when there is a collision with the work piece 9 and making it possible to prevent damage or the like to the surface of the work piece 9. Furthermore, in the present embodiment, the synthetic resin chip 210 is provided to the forefront end of the spindle 21, making it possible to prevent damage or the like to the surface of the work piece 9 when there is contact.

In the present embodiment, the position of the forefront end of the spindle 21 can be adjusted by the adjustment mechanism 224. Through such adjustment, the amount by which the forefront end of the spindle 21 projects past the non-contact probe 17 can be adjusted and characteristics of the collision detection can be adjusted. In addition, even in a case where the dimensions of the non-contact probe 17 have changed, the support position of the spindle 21 can be adjusted to accommodate such changes.

In the present embodiment, using the retreat mechanism 225, the spindle 21 can be made to retreat from a position where contact with the work piece 9 is possible during collision detection, to a position not in contact with the work piece 9. Therefore, in a case where collision detection is unnecessary (for example, in a case where the non-contact probe 17 is displaced along the surface of the work piece 9), by retreating the spindle 21 ahead of time, unnecessary contact between the spindle 21 and the work piece 9 can be prevented before such contact occurs.

In the present embodiment, using the probe switching mechanism 226, the support position of the spindle 21 can be switched in accordance with the type of non-contact probe 17. Therefore, even in a case where the type of non-contact probe 17 has changed, the position of the forefront end of the spindle 21 can be maintained in a predetermined relationship with respect to the non-contact probe 17.

Modifications

The present invention is not limited to the above-described embodiment, and includes modifications within a scope capable of achieving the advantages of the present invention. For example, in the support mechanism 22, the adjustment mechanism 224, the retreat mechanism 225, and the probe switching mechanism 226 are not essential, and any of the three mechanisms may be omitted.

In addition, the adjustment mechanism 224, the retreat mechanism 225, and the probe switching mechanism 226 all have in common that they cause the spindle 21 to displace, and any of the three may be combined with any other.

Moreover, the adjustment mechanism 224, the retreat mechanism 225, and the probe switching mechanism 226 are not limited to adjusting the position of the spindle 21 by loosening the respective bolts, and can instead adopt any existing configuration capable of adjusting a position.

In the embodiment, the spindle 21 includes the expansion/contraction mechanism 219. However, the expansion/contraction mechanism 219 is not limited to performing advance/retreat-type expansion and contraction via the spindle main body 211 and the displacement member 212, and may instead expand and contract by forming the spindle 21 with an elastic member. Moreover, the spindle 21 may also be a member that does not expand and contract, and cushioning may be ensured by the chip 210 on the forefront end of the spindle 21.

In the embodiment, using the expansion/contraction mechanism 219 of the spindle 21, conduction between the fixated contact point 233 and the displacement contact point 234 is switched on and off by the expansion/contraction; however, the switch may have some other configuration instead. For example, displacement of the displacement member 212 relative to the spindle main body 211 may be detected by an optical sensor. In addition, the spindle 21 may be conductive all the way to its forefront end, and electrical conduction between the spindle 21 and the work piece 9 may be detected.

The present invention can be used as a collision prevention device of a measurer measuring dimensions or the like of a measured object while relatively displacing the measured object and a non-contact probe.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A collision prevention device of a measurer configured to measure a measured object while relatively displacing the measured object and a non-contact probe, the collision prevention device comprising:
   a rod extending alongside the non-contact probe;
   a support configured to support the rod such that a forefront end of the rod projects farther than the non-contact probe, the support comprising an adjuster that allows an operator to selectively proximally and distally adjust a position of the rod relative to the non-contact probe in the length direction of the rod; and
   a switch configured to detect a collision between the rod and the measured object.

2. The collision prevention device of the measurer according to claim 1, wherein the rod includes a displacer configured to expand and contract in a length direction of the rod.

3. The collision prevention device of the measurer according to claim 2, wherein the support includes a retractor configured to cause the rod to retract.

4. The collision prevention device of the measurer according to claim 3, wherein the support comprises a probe switch configured switch, in accordance with a type of non-contact probe, the support position of the support in a length direction of the rod.

5. The collision prevention device of the measurer according to claim 2, wherein the support comprises a probe switch configured switch, in accordance with a type of non-contact probe, the support position of the support in a length direction of the rod.

6. The collision prevention device of the measurer according to claim 1, wherein the support includes a retractor configured to cause the rod to retract.

7. The collision prevention device of the measurer according to claim 6, wherein the support comprises a probe switch configured switch, in accordance with a type of non-contact probe, the support position of the support in a length direction of the rod.

8. The collision prevention device of the measurer according to claim 1, wherein the support comprises a probe switch configured switch, in accordance with a type of non-contact probe, the support position of the support in a length direction of the rod.

\* \* \* \* \*